United States Patent
LaBrie et al.

(10) Patent No.: US 9,259,907 B2
(45) Date of Patent: *Feb. 16, 2016

(54) METHODS AND APPARATUS FOR THE MANUFACTURE OF LABELS

(75) Inventors: Frederic LaBrie, Boucherville (CA); Yves St-Amant, St-Joseph-du-Lac (CA); Francois Bayzelon, Boucherville (CA)

(73) Assignee: ETI Converting Equipment, Inc., Boucherville, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/459,312

(22) Filed: Apr. 30, 2012

(65) Prior Publication Data

US 2012/0279643 A1 Nov. 8, 2012

Related U.S. Application Data

(60) Provisional application No. 61/481,817, filed on May 3, 2011.

(51) Int. Cl.
| | |
|---|---|
| *B32B 38/10* | (2006.01) |
| *B32B 37/20* | (2006.01) |
| *B32B 37/12* | (2006.01) |
| *B32B 37/00* | (2006.01) |
| *B32B 37/02* | (2006.01) |
| *B32B 38/00* | (2006.01) |

(52) U.S. Cl.
CPC ........... *B32B 37/203* (2013.01); *B32B 37/1284* (2013.01); *B32B 37/0053* (2013.01); *B32B 37/02* (2013.01); *B32B 38/10* (2013.01); *B32B 38/145* (2013.01); *B32B 2309/105* (2013.01); *B32B 2429/00* (2013.01); *Y10T 156/11* (2015.01); *Y10T 156/12* (2015.01); *Y10T 156/19* (2015.01)

(58) Field of Classification Search
CPC .......... B32B 38/10; B32B 7/06; B32B 37/12; B32B 38/0004; B32B 27/36; B32B 37/025; B32B 38/1858; B32B 2519/00
USPC .................. 156/249, 248, 250, 230, 234, 268
See application file for complete search history.

(56) References Cited

U.S. PATENT DOCUMENTS

| | | | | |
|---|---|---|---|---|
| 5,470,418 | A * | 11/1995 | Instance | 156/231 |
| 7,226,812 | B2 * | 6/2007 | Lu et al. | 438/114 |
| 8,268,645 | B2 * | 9/2012 | Kell et al. | 438/19 |
| 2003/0089452 | A1 * | 5/2003 | Hansen et al. | 156/268 |
| 2004/0250947 | A1 * | 12/2004 | Phillips et al. | 156/250 |
| 2011/0132522 | A1 * | 6/2011 | Green et al. | 156/80 |

* cited by examiner

*Primary Examiner* — Michael N Orlando
*Assistant Examiner* — Margaret Squalls
(74) *Attorney, Agent, or Firm* — Young Basile Hanlon & MacFarlane, P.C.

(57) ABSTRACT

A first process for making labels comprises the steps of feeding a laminated combination of a face stock and a process liner to a cutting station such as a microperforator or die-cutter and thereafter stripping the process liner from the face stock and further processing the face stock. The process liner may be recycled and reused. A second method includes all of the steps described above along with the further step of laminating the cut or perforated face stock, immediately after stripping off the process liner, to a second lighter liner which carries the face stock, minus the web or matrix of waste material, to a roller. A complete description of the machinery is given herein.

3 Claims, 3 Drawing Sheets

METHODS AND APPARATUS FOR THE MANUFACTURE OF LABELS

CROSS-REFERENCE TO RELATED APPLICATION

This application claims the benefit of U.S. provisional patent application Ser. No. 61/481,817 filed May 3, 2011.

FIELD OF THE INVENTION

The invention relates to methods for manufacturing adhesive labels from face stock and to an apparatus for carrying out the methods.

BACKGROUND OF THE INVENTION

It is known to manufacture adhesive labels in a mass production fashion from a substantially continuous strip of suitable face stock. The apparatus and methodology for producing such labels can include serialized stations for applying release layers, applying adhesive layers, performing cutting operations and performing stripping operations. Machines for manufacturing labels using some or all of these steps are available from ETI Converting Equipment, Ltd., of Boucherville, Quebec Canada J4B 5H3.

SUMMARY OF THE INVENTION

The first aspect of the subject matter disclosed herein is a method for manufacturing labels from appropriate face stock comprising the steps of feeding a laminate of the face stock and a specially fabricated process liner into a cutter station, thereafter separating the process liner from the cut face stock, and thereafter carrying out further processing steps on the cut face stock.

According to a second aspect of the subject matter disclosed herein, the further processing may include laminating the cut face stock to a second fabricated liner which is thinner than the process liner. In an illustrative embodiment hereinafter described in greater detail, the process liner is made of a high density polyester and has a thickness of about 1.5 to 2.5 mils whereas the second thinner liner which carries the cut labels is made of a polymeric material such as polyester or polypropylene and has a thickness on the order of about 0.5 mils.

In accordance with a preferred implementation of the method subject manner described herein, the process liner, after being separated from the face stock, may be rewound and reused a number of times.

A still further aspect of the subject matter described herein is an apparatus for carrying out one or both of the processes briefly described above and described in more detail hereinafter.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying photographs, the latter being briefly described hereinafter.

BRIEF SUMMARY OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENTS

This application is based in part on a provisional application Ser. No. 61/481,817 filed May 3, 2011 in the U.S. Patent and Trademark Office by the inventors Frédéric LaBrie, Yves St-Amant and Francois Bayzelon and assigned to ETI Converting Equipment, Ltd. of Boucherville, Quebec Canada. The entire disclosure of that provisional application is incorporated herein by reference.

Figure 1:
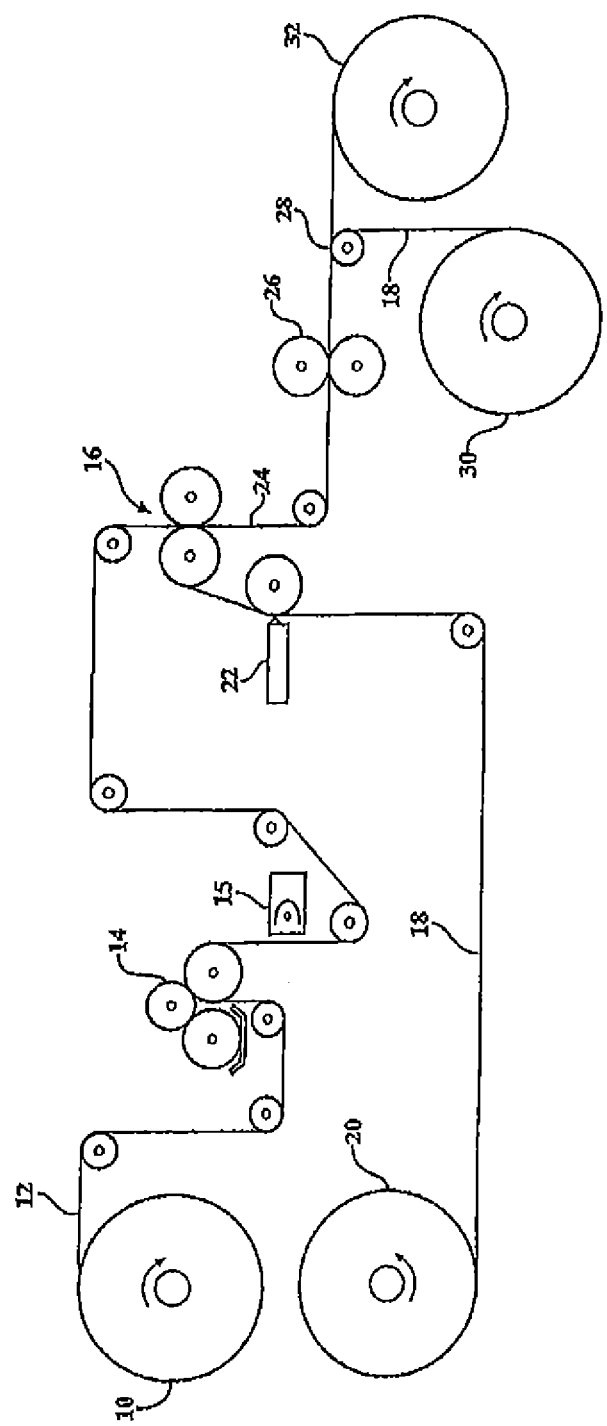
FIG. 1 is a schematic diagram of an apparatus for carrying out a first method according to the disclosure made herein.

Referring now to FIG. 1, a first apparatus and a first method for making labels is described as follows: a continuous strip 12 of face stock is unwound from a roll 10 and caused by a suitable transfer system to pass to a silicon coating station 14 and thereafter to an ultraviolet curing station 15. At the same time, a continuous strip 18 of polyester process liner material is taken from a roll 20 and caused to pass through an adhesive coating station 22 whereafter it is laminated to the face stock strip 12 at station 16 to produce a continuous strip laminate 24. That laminate travels continuously to a die-cutting station 26 which may be implemented as a rotary die cutter or a laser cutter to define individual labels from the face stock strip 12. In some cases, this can create a matrix of waste material surrounding the individual adhesive-backed labels. The process liner 18 is not cut or otherwise significantly damaged in the cutting process. The face stock 12 may be paper or polymeric film and may be pre-printed.

The laminate with the cut labels and any waste matrix that may have been created passes to a station 28 wherein the process liner 18 is separated from the laminate 24 and rewound onto roller 30 while the strip of individual labels passes to a rewinder roller 32.

Figure 2:
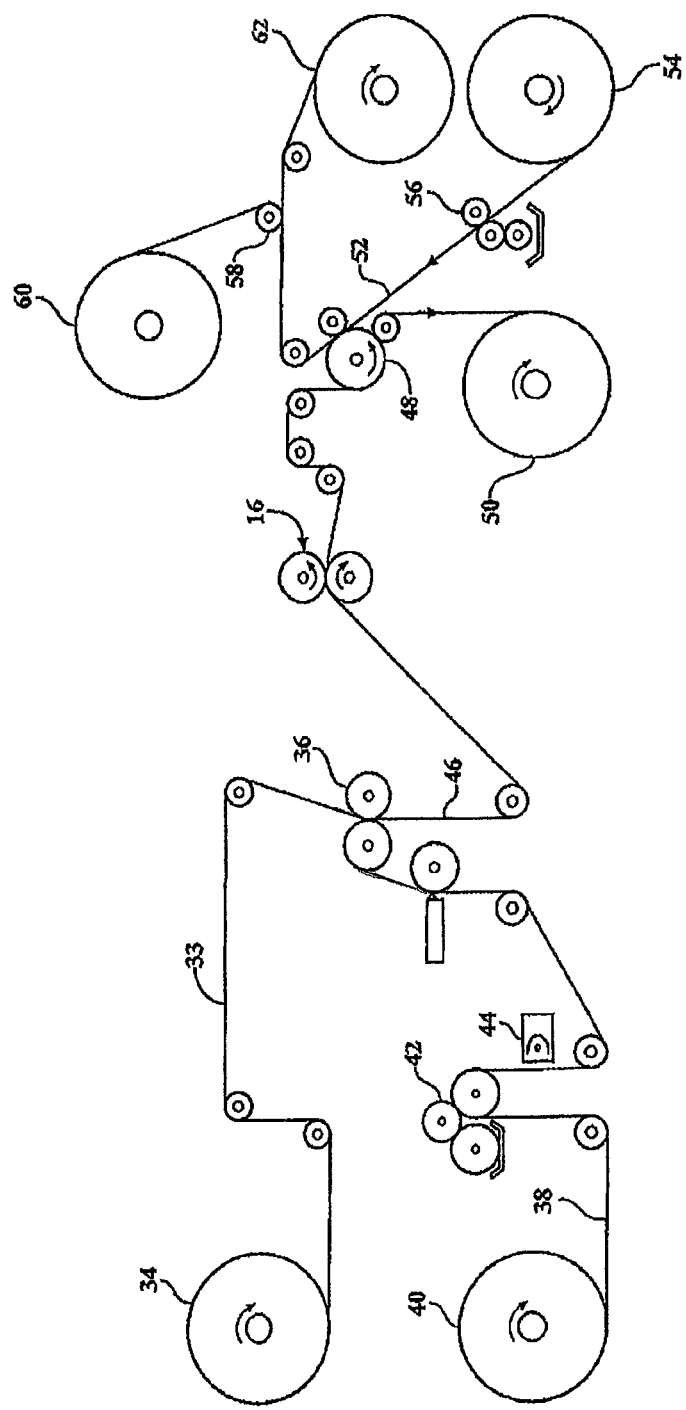
FIG. 2 is a schematic diagram of a second apparatus for carrying out a second method according to the disclosure made herein.

FIG. 2 shows a second embodiment is described as follows. Face stock 33 is taken in a continuous strip from a roll 34 and caused to travel in continuous fashion to a laminating station 36. At the same time, a process liner 38 identical to the process liner 18 described with respect to FIG. 1 is taken from a roll 40 and passed through an optional silicon coating station 42 and an optional ultraviolet curing station 44. The process liner thereafter travels to the laminating station 36 where it is joined to the face stock 33 to form a laminate 46 which travels to the die-cutting station 16 which may be identical to the station similarly numbered in FIG. 1.

Thereafter, the die-cut face stock laminated to the process liner continues on to a vacuum anvil 48 where the process liner 48 is separated or stripped from the cut face stock and gathered on a roll 50 for reuse. While on the vacuum anvil, the cut face stock labels and any waste matrix are laminated to a second thinner liner material 52 which is taken from a stock roll 54 and passed through an optional silicon coating station 56 where a release layer may be applied. The laminated combination of the cut face stock and the second liner material then passes on to a stripping station 58 where the matrix of face stock material is stripped off and gathered on a roll 60. The combination of the individual adhesive-backed labels and the second liner material travels forward to a roll 62. It will be understood by those familiar with the present technology that the roll 62 is formed up to a manageable size and weight after which a second spool is put in place and a new roll is begun. Apart from that break, the rewinding is substantially continuous.

Figure 3:
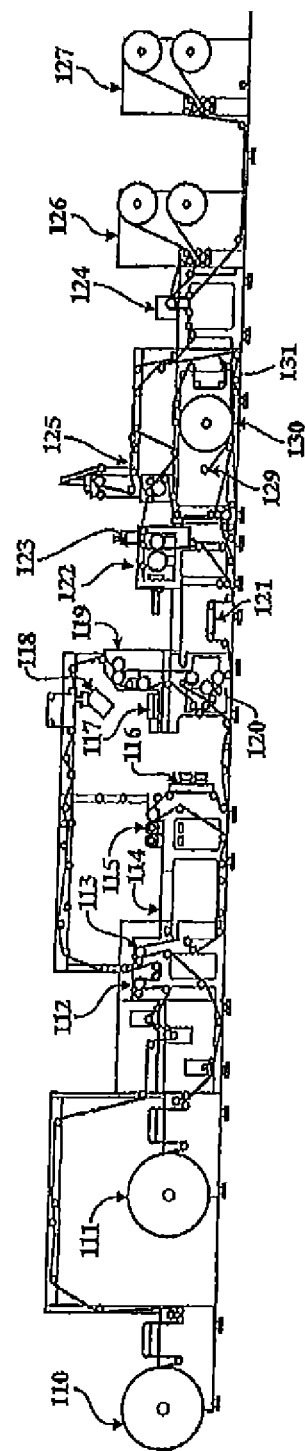
FIG. 3 is a more detailed view of an apparatus for carrying out the methods disclosed herein.

Referring to FIG. 3, an apparatus which may be used to perform the methods described above with respect to FIGS. 1 and 2 is shown to comprise a series of components spaced from one another in the direction of the travel of a continuous strip of face stock 110 from left to right through successive stations to perform the various process or method steps.

The machinery includes a web unwind for the face stock spool 110 and a web unwind for the thin liner 111 as described above with reference to FIGS. 1 and 2. The web unwind may comprise multiple rollers to support and guide the web, a web guide to align the web in the machinery, a tension control unit, a magnetic particle braking system to provide control of tension, a pair of corona treatment units to treat both sides of the face stock to yield good adhesion between the face stock and printing or other coatings to the face stock, and a corona treatment unit to properly treat the top side of the process liner in the case that the process liner and/or thin liner is coated with a release layer of silicone as described above with reference to FIG. 2.

The web infeed 112 for the face stock may include an infeed cylinder and a neoprene covered nip roller, a series of rollers and a pair of load cells to read the tension values and send signals to a servo motor drive controller. A set point value may be entered by way of a state-of-the-art panel and viewing screen and used in a conventional feedback comparison technique to control tension. The web infeed 113 for the process liner includes an infeed cylinder, a neoprene covered nip roller, a series of rollers and a pair of load cells reading the tension value and sending a signal to the servo motor drive controller. Another set point value may be used in the fashion described above.

The face stock may be pre-printed or printed during the process carried out by the machinery shown in FIGS. 1 through 3. A printing station 114 may, for example, include a variable digital imaging system such as an inkjet or ion deposition unit or a conventional printing method such as flexography, offset or gravure printing. Multiple printing stations may be provided.

The machinery shown in FIG. 3 further comprise a coating station 115 for applying a release coating to the top of the face stock or on top of the thin liner and release curing station 116 as generally described with respect to FIG. 2. The first coating station may include an ultraviolet silicon release coating station followed by a curing station including an ultraviolet curing unit with a nitrogen chamber equipped with nitrogen flow control. This unit may also be equipped with an oxygen analyzer to detect the level of oxygen present in the chamber.

A second coating station 117 is provided for applying permanent or repositionable adhesive to the top side of the process liner. This machinery may include an online adhesive coating weight measurement system 118 to provide a means to verify the uniformity of the adhesive coat weight across the strip or web of material. The process liner comes from source roll 130. A laminating station 119 is provided to laminate both the face stock and the process liner together, this station being shown at 36 in FIG. 2 and at 14 in FIG. 1. A laminating unit 119 may include, by way of example, a neoprene covered steel roll pressing against a precision chromed chill roll creating a nip point where the two webs are laminated together.

The machinery further comprises a series of chrome plated chill rolls 120 biasing the laminated web to the room temperature or below before microperforating or die-cutting in the cutter station. The series of chill rolls are connected to a liquid chiller which controls the temperature to a preset value.

The use of chill rolls 120 ensures that any adhesive applied to the laminate is sufficiently cold to be efficiently die-cut or microperforated. A web guide unit 121 aligns the web before it enters the due-cutting station. A horizontal die-cutting station 122 includes a die-cutting cylinder running against a hardened anvil cylinder as provided downstream from the web guide unit 121. The horizontal die cut unit includes a die-cutting cylinder mounted in a cassette, an eccentrically adjustable polyurethane covered anvil or solid anvil also mounted in a cassette and a hydraulic pressure cylinder pushing on the cassette side to ensure a constant and solid die cutting pressure at 122.

The machinery of FIG. 3 may further include a video inspection system 123 provided to verify the quality of the printing and the precision of the registration between the printing and the position of the die-cutting. An outfeed unit 124 pulls and controls the tension of the web through the process. The web outfeed includes an outfeed cylinder and a neoprene covered nip roller. A series of rollers and load cells read the tension value and provide for a signal to the servo motor drive controller in the conventional manner described above using a set point value entered by way of a conventional panel and viewing screen.

A delamination unit or "transfer station" 125 is provided to separate the face stock from the process liner. This delamination unit 125 includes a neoprene covered roll serving as a nip and activated using pneumatic cylinders. In this unit, the web goes first through the outfeed and then through the delamination unit where the operation separates the two webs and directs the face stock and the process liner to their respective rewind rolls as described above.

In this unit, the web goes first in the delamination station where the die-cut face stock is delaminated from the process liner. The process liner is then rewound on 129. The die-cut face stock is then held by a vacuum system before being laminated to the thin liner in the delamination station. This lamination is then matrix stripped and rewound on 126 or 127.

Many types of ultraviolet curable silicones can be used. As a first example, the silicon may be Evonik RC702 with RC711, additive polymer RC351 and a photo initiator Al 1. This UV silicone is cured as a dry coat in the range of .8 to 1.6 grams per square meter. The UV silicone is cured in an inert chamber by UV curing system where oxygen is limited to less than 50 pails per million (ppm). Oxygen is removed from the chamber by nitrogen with a purity level of at least 99.998. The oxygen is distributed through precision flow meters. Further details may be provided in the provisional application as identified above.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method of manufacturing adhesive-backed labels comprising the steps of:
   a. joining by adhesive a continuous uncut strip of label stock to a strip of process liner material having a thickness of between about 1.5 and 2.5 mils at a laminating station;
   b. advancing the joined stock and liner to a cutting station and cutting through only the label stock while on the process liner to form a series of individual labels without cutting through the process liner;

c. transferring the individual cut labels from the process liner to a second strip of liner material having a thickness of about 0.5 mils; and d. recycling the process liner by gathering the process liner on a roll.

2. A method as defined in claim 1 wherein the process liner is formed of polyester.

3. A method as defined in claim 2 wherein the second liner is formed of a polymeric material.

* * * * *